UNITED STATES PATENT OFFICE 2,443,888

SYNTHETIC WAXES AND METHOD OF PREPARING THE SAME

George J. Bohrer, Troy, N. Y., assignor to General Electric Company, a corporation of New York No Drawing. Application July 4, 1945,
Serial No. 603,240

6 Claims. (Cl. 260—326)

This invention relates to new and useful wax-like materials or synthetic waxes and to a method of preparing the same. More particularly the invention is concerned with compositions or products comprising a wax-like material obtained by effecting reaction under heat, more particularly until an acid number not substantially exceeding 35 has been obtained, between tetrachlorophthalic anhydride and a mixture of monoamines including essentially a plurality of monoamyl amines having an initial boiling point of at least 84° C., at least 95 per cent distilling off below 100° C. and a final boiling point not higher than 110° C. The reactants are employed in substantially equivalent molar proportions or with a slight molar excess of the amine reactant.

It was known prior to my invention that synthetic waxes could be prepared by effecting reaction under heat between an aliphatic polyamine, specifically propylene diamine, and a nuclearly halogenated, specifically nuclearly chlorinated, aromatic monocarboxylic acid or ortho-dicarboxylic acid, more particularly benzene-o-dicarboxylic acid (phthalic acid), or an acid halide of such acids, e. g., trichlorobenzoyl chloride. Such waxes are more fully described and are specifically claimed in the copending application of Murray M. Sprung, Serial No. 495,045, filed July 16, 1943, now U. S. Patent 2,408,700, issued October 1, 1946, and assigned to the same assignee as the present invention.

I have discovered that synthetic waxes which are flame-resisting, non-toxic and non-irritating to the skin of the average person can be prepared by effecting reaction under heat, more particularly until an acid number not substantially exceeding 35 has been obtained, between tetrachlorophthalic anhydride and a mixture of monoamines including a plurality of monoamyl amines having the distillation characteristics mentioned in the first paragraph of this specification. I have also surprisingly discovered that the properties of the end product can be improved, e. g., the melting point can be increased, without detrimentally affecting the other useful properties, by incorporating an aromatic monoamine, specifically aniline, into the reaction mixture in addition to the aforementioned plurality of monoamyl amines.

The synthetic waxes of this invention have a high melting point, the melting point being of the order of 120° C. and above. They are stable at temperatures at least as high as their melting point, and show excellent water resistance and dielectric strength. When applied to a base, for instance wood, metal (e. g., iron, steel, brass, etc.) and the like, a surface finish having a high gloss is obtained. The substantially neutral, waxy end products, the acid numbers of which may range, for example, from 0 or approximately 0 to 35 or thereabouts are mixtures or complexes of N-substituted tetrachlorophthalimides, the N-substituent grouping of the individual tetrachlorophthalimide corresponding to one or another of the hydrocarbon substituents of the monoamines employed. The individual N-substituted tetrachlorophthalimide, in pure state, may be represented by the following general formula:

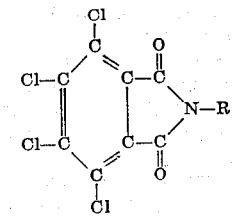

where R represents a phenyl radical or a hydrocarbon radical derived from normal or isomeric monoamyl amine.

The mixture of monoamyl amines used in producing my new synthetic waxes is sold by The Sharples Solvents Corporation, Philadelphia, Pa., under the following specifications:

| | |
|---|---|
| Color | Water-white |
| Specific gravity at 20° C | 0.76–0.78 |
| Water dilution | At least 20:1 |
| Monoamyl amine content | At least 90% |
| Distillation: | |
| Initial boiling point | Not below 84° C. |
| Not less than 95% | Below 100° C. |
| Final boiling point | Not above 110° C. |

It is a mixture of the various monoamyl amines including:

| | Approximate boiling point, °C. |
|---|---|
| Tertiary amyl amine | 82 |
| Secondary isoamyl amine | 87 |
| 2-aminopentane | 89 |
| 3-aminopentane | 90 |
| Active amyl amine | 94 |
| Isoamyl amine | 95 |
| Normal amyl amine | 104 |

In order that those skilled in the art better may understand how the present invention may be carried into effect, the following examples are given by way of illustration and not by way of limitation. All parts and percentages are by weight. The "mixture of monoamyl amines"

mentioned in the examples meets the specifications, both as to composition and properties, including distillation characteristics, above set forth.

Example 1

|  | Parts |
|---|---|
| Inert diluent, specifically "Solvesso #1" [1] | 1,750 |
| Tetrachlorophthalic anhydride | 1,750 |
| Mixture of monoamyl amines | [2] 550 |

[1] "Solvesso #1" is a hydrocarbon solvent produced and sold by The Standard Oil Company of New Jersey, New York, N. Y. It meets the following specifications:

| Specific gravity (15.5/15.5° C.) | 0.820–0.830 |
|---|---|
| Distillation: | |
| Initial boiling point, minimum | 90° C. |
| 90% distilled off, maximum | 128° C. |
| End point, maximum | 140° C. |
| Aniline No., maximum | 22° C. |

[2] This amount of the mixture of monoamyl amines provides 3.4% excess over that theoretically required for reaction with tetrachlorophthalic anhydride to form a mixture of N-substituted tetrachlorophthalimides.

The above ingredients were added, in the order given, to a reaction vessel provided with stirring apparatus and a reflux condenser. The tetrachlorophthalic anhydride was dispersed with stirring in the inert diluent, after which the mixture of monoamyl amines was added with vigorous stirring to the closed vessel at such a rate that there was no loss of amine from the condenser. The ingredients were heated together under reflux at the boiling temperature of the mass for about 2 hours. The water of reaction, diluent and any unreacted amine were now removed by distillation at atmospheric pressure. When the liquid temperature had reached about 145° to 150° C., vacuum was gradually applied while maintaining the temperature of the mass at about 140° to 145° C. When no more distillate could be obtained, the reaction product was withdrawn from the reaction vessel and allowed to solidify. The solid material was a synthetic wax containing about 40 per cent combined chlorine and having an acid number of 32 (with phenol red as indicator) and a solidification point of 128° to 130° C.

Example 2

|  | Parts |
|---|---|
| Inert diluent, specifically "Solvesso #1" | 150 |
| Tetrachlorophthalic anhydride | 143 |
| Mixture of monoamyl amines | 41 |
| Aniline | 5 |

The procedure was essentially the same as that described under Example 1. The mixed monoamyl amines and aniline in the above formula are in the molar ratio of about 9 mols of the former to 1 mol of the latter. The aniline provides an end product having a higher melting point and a higher solidification point than is possible with the mixture of monoamyl amines alone, as evidenced by the fact that the waxy reaction product of this example had a solidification point of 144° to 148° C. Its acid number was about 25.

The molar ratio of aniline to the mixture of monoamyl amines may be varied as desired or as conditions may require in order to obtain a synthetic wax having the particular increase in melting point wanted. Thus, the aniline and mixed monoamyl amines may be employed in molar ratios varying, for example, from 1 mol of the former to from 0.1 to 100 or more mols of the latter. No particular advantage ordinarily accrues from the use of aniline in less than 3 molar per cent of the combined amine reactants. The aniline and mixed monoamyl amines may be used in equal molar ratios if desired.

I prefer to effect reaction between the tetrachlorophthalic anhydride and the mixture of monoamines while these ingredients are admixed with an inert diluent such, for instance, as petroleum naphtha, coal-tar naphtha, etc., of suitable boiling point or range. It will be understood, of course, by those skilled in the art that the reaction also may be carried out in the absence of an inert diluent, in which case the reaction is effected under substantial superatmospheric pressure.

The synthetic waxes of this invention have a wide variety of commercial applications. For instance, they may be used in protectively covering metallic surfaces to prevent corrosion and in treating wood to prevent decay. The fire-proof character of these waxes makes them especially suitable for use, alone or with other ingredients, e. g., a volatile solvent, in coating or coating and impregnating fabric and other textile materials, e. g., materials comprising natural or synthetic fibers. They may be used in treating filaments, threads, yarns, etc., of cotton, wool, silk, linen, nylon, rayon, glass, Aralac, Saran, etc., or fabrics woven or otherwise formed from such materials or combinations thereof. They may be used as modifiers of other materials, e. g., paraffin wax, asphalt or other bituminous materials of petroleum or coal-tar origin, to impart improved properties thereto. They also may be employed in the manufacture of carbon papers, for lubricating molds, as a dielectric material alone or in combination with other dielectrics, e. g., oils, paper, Cellophane, cellulose esters, e. g., cellulose acetate, etc., cellulose ethers, e. g., ethyl cellulose, etc., glass fibers, asbestos, natural and synthetic resins, etc., as a component of varnishes, enamels, lacquers, paints and other liquid coating compositions, as an ingredient of furniture polishes, floor polishes, automobile polishes, etc., and for numerous other purposes. They are especially suitable for use in compositions such as are disclosed and claimed in my copending application Serial No. 603,239, filed concurrently herewith and assigned to the same assignee as the present invention.

What I claim as new and desire to secure by Letters Patent of the United States is:

1. A product comprising a wax-like material having an acid number below 35 and a melting point of the order of 120° C. and above, which is stable at temperatures at least as high as its melting point, the said material comprising a complex, heat-reacted mixture of N-amyl-substituted tetrachlorophthalimides corresponding to the general formula

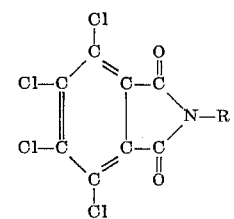

where R represents a five-membered hydrocarbon radical derived from normal and isomeric monoamyl amines, the said wax-like material having been obtained by interaction under heat between tetrachlorophthalic anhydride and a mixture of monoamines including a plurality of monoamyl amines consisting essentially of tertiary amyl amine, secondary isoamyl amine, 2-aminopentane, 3-aminopentane, active amyl amine, isoamyl amine, and normal amyl amine, the said mixture of amines having an initial boiling point of at least 84° C., at least 95 per cent distilling off below 100° C., and a final boiling point not higher than 110° C.

2. The method of preparing new wax-like materials which comprises effecting reaction, until an acid number not substantially exceeding 35 has been obtained, between tetrachlorophthalic anhydride and a mixture of monoamines including essentially a plurality of monoamyl amines having an initial boiling point of at least 84° C., at least 95 per cent distilling off below 100° C. and a final boiling point not higher than 110° C.

3. A waxy material having an acid number below 35 and a melting point of the order of 120° C. and above, which is stable at temperatures at least as high as its melting point, the said material comprising a complex, heat-reacted mixture of N-phenyl tetrachlorophthalimide and a mixture of N-amyl tetrachlorophthalimides corresponding to the general formula

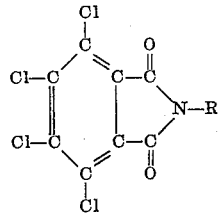

where R represents a five-membered hydrocarbon radical derived from normal and isomeric monoamyl amines, the said wax-like material having been obtained by interaction under heat between tetrachlorophthalic anhydride and a mixture of monoamines consisting essentially of aniline and a mixture of monoamyl amines including essentially tertiary amyl amine, secondary isoamyl amine, 2-aminopentane, 3-aminopentane, active amyl amine, isoamyl amine, and normal amyl amine, the said mixture of amyl amines having an initial boiling point of at least 84° C., at least 95 per cent distilling off below 100° C., and a final boiling point not higher than 110° C.

4. A method as in claim 2 wherein the reaction between the tetrachlorophthalic anhydride and the mixture of monoamines is effected under reflux while the said ingredients are admixed with a diluent which is inert to the reactants during the reaction, and at the boiling temperature of the diluted reaction mass.

5. The method which comprises dispersing tetrachlorophthalic anhydride in a liquid hydrocarbon diluent, adding thereto a mixture of monoamyl amines, having an initial boiling point of at least 84° C., at least 95 per cent distilling off below 100° C., and a final boiling point not higher than 110° C., with vigorous stirring under conditions such that there is no substantial loss of said amines during the addition, the amount of the said mixture of monoamyl amines being such that there is a slight excess over that theoretically required for reaction with tetrachlorophthalic anhydride to form a mixture of N-substituted tetrachlorophthalimides, heating the resulting mass under reflux at the boiling temperature of the mass for about 2 hours, removing the water of reaction, liquid hydrocarbon diluent and unreacted amine by distillation at atmospheric pressure, removing any remaining distillate under vacuum when the liquid temperature reaches about 145° to 150° C., said application of vacuum being continued while maintaining the temperature of the reaction mass at about 140° to 145° C., withdrawing the reaction product from the reaction vessel and allowing it to solidify, the solid reaction product being a synthetic wax containing, by weight, about 40 per cent combined chlorine and having a solidification point of 128° to 130° C.

6. A waxy material as in claim 3 wherein the aniline and the plurality of monoamyl amines are employed in amounts corresponding to from 0.1 to 100 mols of the latter for each mol of aniline.

GEORGE J. BOHRER.

REFERENCES CITED

The following references are of record in the file of this patent:

UNITED STATES PATENTS

| Number | Name | Date |
|---|---|---|
| 2,225,392 | Pool et al. | Dec. 17, 1940 |

OTHER REFERENCES

Chemical Abstracts, vol. 12, pp. 479, 480 (1918). (Copy in Div. 6.) Citing: Pratt et al., Journal Am. Chem. Soc., 40:198–214 (1918).

Chemical Abstracts, vol. 28, pp. 4400 (1934). (Copy in Div. 6.) Citing: Allen et al., Jour. Am. Chem. Soc., 56:1409–1410 (1934).

Beilstein, Vierte Auflage, vol. XXI, page 505. (Copy in Div. 6.)